(12) United States Patent
Tian et al.

(10) Patent No.: US 12,517,952 B2
(45) Date of Patent: Jan. 6, 2026

(54) SEMI-STRUCTURED DATA DECOMPOSITION

(71) Applicant: INTERNATIONAL BUSINESS MACHINES CORPORATION, Armonk, NY (US)

(72) Inventors: Lei Tian, Xi'an (CN); Han Zhang, Xi'an (CN); Yi Shao, Xi'an (CN); Ying Xu, Xian (CN); Fu Ju An, Xi'an (CN); Yi Li, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 17/930,461

(22) Filed: Sep. 8, 2022

(65) Prior Publication Data

US 2024/0086464 A1 Mar. 14, 2024

(51) Int. Cl.
*G06F 16/81* (2019.01)
*G06F 16/25* (2019.01)
*G06F 16/84* (2019.01)

(52) U.S. Cl.
CPC ........... *G06F 16/81* (2019.01); *G06F 16/258* (2019.01); *G06F 16/86* (2019.01)

(58) Field of Classification Search
None
See application file for complete search history.

(56) References Cited

U.S. PATENT DOCUMENTS

| | | | |
|---|---|---|---|
| 7,836,085 B2* | 11/2010 | Petakov | G06F 16/9537 707/809 |
| 9,876,507 B2* | 1/2018 | Rastogi | H03M 7/30 |
| 10,824,675 B2* | 11/2020 | Alonso | G06F 16/9024 |
| 11,327,962 B1* | 5/2022 | Borthakur | G06F 16/2358 |
| 2013/0144605 A1* | 6/2013 | Brager | G06F 16/30 704/9 |
| 2014/0281748 A1* | 9/2014 | Ercegovac | G06F 11/0727 714/49 |
| 2016/0055184 A1* | 2/2016 | Fokoue-Nkoutche | G06F 16/213 707/809 |
| 2016/0188747 A1* | 6/2016 | Cypher | G06F 16/84 707/756 |
| 2016/0371392 A1* | 12/2016 | Brown | G06F 16/81 |

(Continued)

FOREIGN PATENT DOCUMENTS

CN   111897803 A   * 11/2020   .......... G06F 11/3604

OTHER PUBLICATIONS

Aftab, et al., "Automatic NoSQL to Relational Database Transformation with Dynamic Schema Mapping." Published Jul. 1, 2020 by Hindawi. 13 pages. Research Article, Open Access, vol. 2020, Article ID 8813350. https://www.hindawi.com/journals/sp/2020/8813350/.

(Continued)

*Primary Examiner* — Loan T Nguyen
(74) *Attorney, Agent, or Firm* — Seed Intellectual Property Law Group LLP

(57) ABSTRACT

A computer-implemented technique for decomposing semi-structured data is provided. In this technique, metadata for a predetermined number of records can be collected from semi-structured data that includes several records. A structured format is generated based on the metadata and the plurality of records is decomposed with the structured format.

10 Claims, 7 Drawing Sheets

(56) References Cited

U.S. PATENT DOCUMENTS

| | | | |
|---|---|---|---|
| 2017/0060950 A1* | 3/2017 | Budhiraja | G06F 16/2456 |
| 2017/0060973 A1* | 3/2017 | Liu | G06F 16/86 |
| 2017/0206256 A1 | 7/2017 | Tsirogiannis | |
| 2017/0316070 A1 | 11/2017 | Krishnan | |
| 2019/0188288 A1* | 6/2019 | Holm | G06F 16/289 |
| 2021/0150056 A1* | 5/2021 | Vax | G06F 16/285 |
| 2022/0100774 A1 | 3/2022 | Shah | |

OTHER PUBLICATIONS

Anonymous. "DataDog Parsing." Accessed Aug. 22, 2022. 24 pages. Published by DataDogHQ. https://docs.datadoghq.com/logs/log_configuration/parsing/?tab=matchers.

Anonymous. "Getting JSON logs into Honeycomb." Accessed Aug. 22, 2022. 5 pages. Published by Honeycomb. https://docs.honeycomb.io/getting-data-in/integrations/json/.

Anonymous. "pandas.read_json." Printed Aug. 22, 2022. 4 pages. Published by pydata.org. https://pandas.pydata.org/pandas-docs/version/0.23.4/generated/pandas.read_json.html.

DiScala, et al., "Automatic Generation of Normalized Relational Schemas from Nested Key-Value Data." Published Jun. 14, 2016 by ACM. 16 pages. In SIGMOD '16: Proceedings of the 2016 International Conference on Management of Data. pp. 295-310. https://doi.org/10.1145/2882903.2882924.

Kocoloski, "Heterogeneous Schema Discovery." Accessed Aug. 22, 2022. 6 pages. Published by Github. https://gist.github.com/kocolosk/8c83c7eabbea555eb37b6ed913652924.

Mell, et al., "The NIST Definition of Cloud Computing," Recommendations of the National Institute of Standards and Technology, U.S. Department of Commerce, Special Publication 800-145, Sep. 2011, 7 pgs.

Roberts, T., "Simplify Querying Nested JSON with the AWS Glue Relationalize Transform." Published Dec. 14, 2017 by Amazon. 9 pages. https://aws.amazon.com/blogs/big-data/simplify-querying-nested-json-with-the-aws-glue-relationalize-transform/.

Shreyas, "Flattening JSON records using PySpark." Published May 1, 2021 by Towards Data Science. 18 pages. https://towardsdatascience.com/flattening-json-records-using-pyspark-b83137669def.

Warman, C., "Automating Snowflake's Semi-Structured JSON Data Handling: Part 2." Published Jan. 15, 2020 by Snowflake. 26 pages. https://www.snowflake.com/blog/automating-snowflakes-semi-structured-json-data-handling-part-2/.

* cited by examiner

SEMI-STRUCTURED DATA DECOMPOSITION

BACKGROUND

Embodiments of the present disclosure relate to data parsing, and more specifically, to semi-structured data decomposition.

Semi-structured data in a form of JSON (JavaScript Object Notation), for example, from NoSQL databases, becomes very popular in data representation and data transferring. For interpretation and joining with structured relational data, the semi-structured data may need to be decomposed (also referred to as flattened).

Data decomposition usually refers to the act of flattening semi-structured data, such as name-value pairs in JSON records, into separate columns where the name becomes the column name that holds the values in the rows.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one embodiment of the present disclosure, there is provided a computer-implemented method for decomposing semi-structured data. In this method, metadata for a predetermined number of records is collected from semi-structured data that includes a plurality of records. A structured format is generated based on the metadata and the plurality of records is decomposed with the structured format.

According to another embodiment of the present disclosure, there is provided an apparatus for decomposing semi-structured data. The apparatus includes one or more processors, a memory coupled to at least one of the one or more processors, and a set of computer program instructions stored in the memory. When the set of computer program instructions is called by at least one of the one or more processors, the one or more processors performs the above method.

According to another embodiment of the present disclosure, there is provided a computer program product for decomposing semi-structured data. The computer program product includes a computer readable storage medium having program instructions embodied therewith. When the program instructions are called by one or more processors, the one or more processors perform the above method.

According to embodiments of the present disclosure, the semi-structured data may be parsed automatically with configurable settings to generate a structured format satisfying customized requirements. The structured format may then be used to decompose the semi-structured data efficiently.

In addition to the exemplary aspects and embodiments described above, further aspects and embodiments will become apparent by reference to the drawings and associated descriptions.

BRIEF DESCRIPTION OF THE SEVERAL VIEWS OF THE DRAWINGS

The detailed description of the present disclosure, in conjunction with the accompanying drawings, clarify the applicable embodiments. In the drawings, the same reference generally refers to the same components.

DETAILED DESCRIPTION

Figure 1:
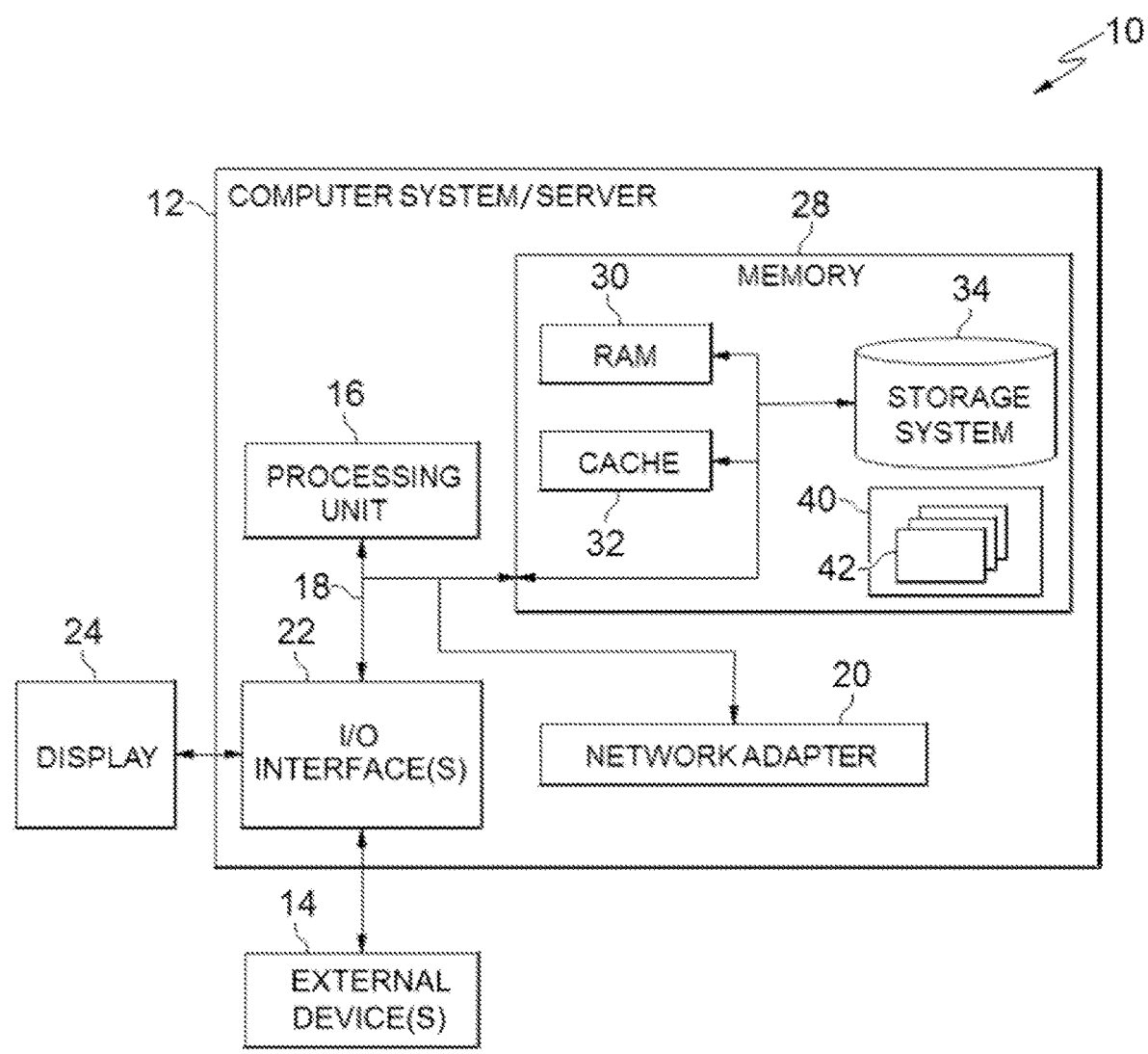
FIG. 1 depicts a cloud computing node, according to one or more embodiments of the present disclosure.

One or more embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, except for limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system or server 12, which may be referred to herein as computer system/server 12, or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform tasks or implement abstract data types. Computer system/server 12 may be practiced in distributed cloud computing environments where tasks are performed by remote processing devices that are linked through a communications network. In a distributed cloud computing environment, program modules may be in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable or non-removable, volatile or non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program or utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
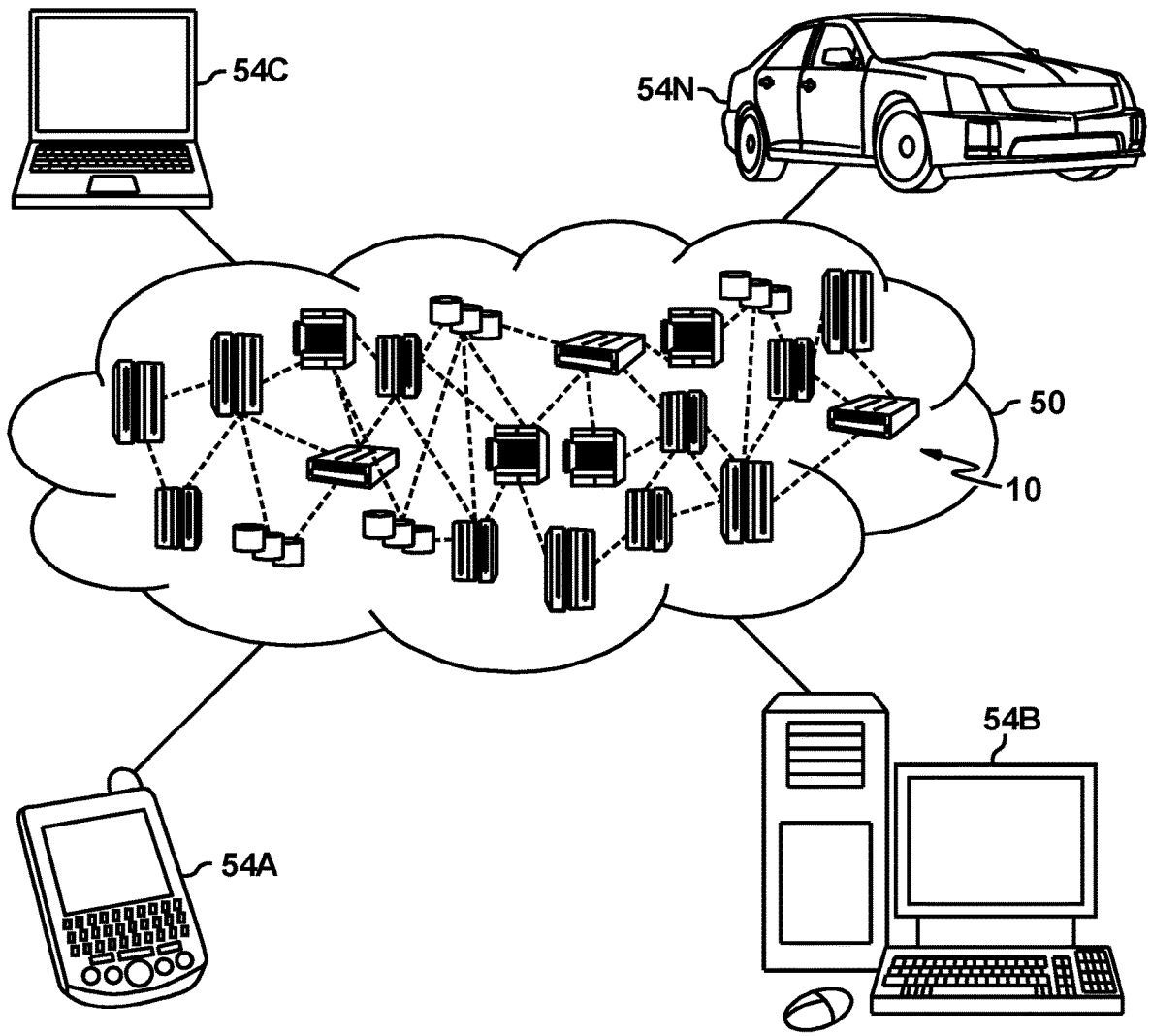
FIG. 2 depicts a cloud computing environment, according one or more embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
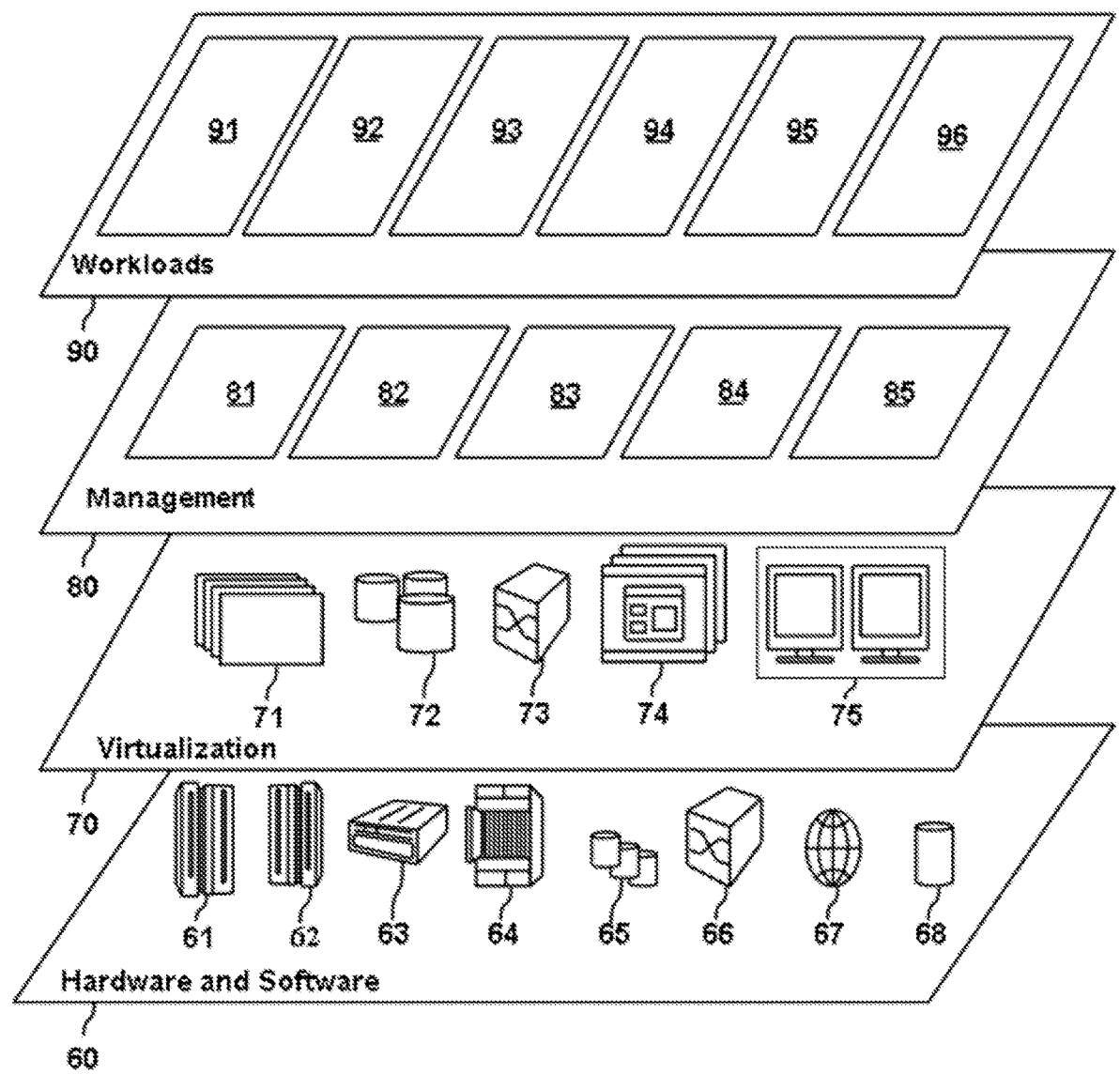
FIG. 3 depicts abstraction model layers, according to one or more embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and decomposition of semi-structured data 96.

Generally, to apply data mining algorithms to JSON records from JSON data, a prerequisite is to flatten (decomposing) semi-structured JSON format into structured format in a convenient and flexible way. However, existing JSON decomposition technics (e.g., Pandas read_json, json_normalize) may not be convenient and flexible enough to process JSON records. Moreover, typical existing decomposition methods handle one JSON record each time and do not collect metadata of different JSON records. Therefore, decomposition of multiple JSON records, that may be nested and/or in arrays, may be difficult.

Embodiments of the present disclosure provide a method for decomposition of semi-structured data. In this method, the semi-structured data may be parsed automatically with configurable settings to generate a structured format satisfying customized requirements. The structured format may then be used to decompose the semi-structured data efficiently.

Figure 4:
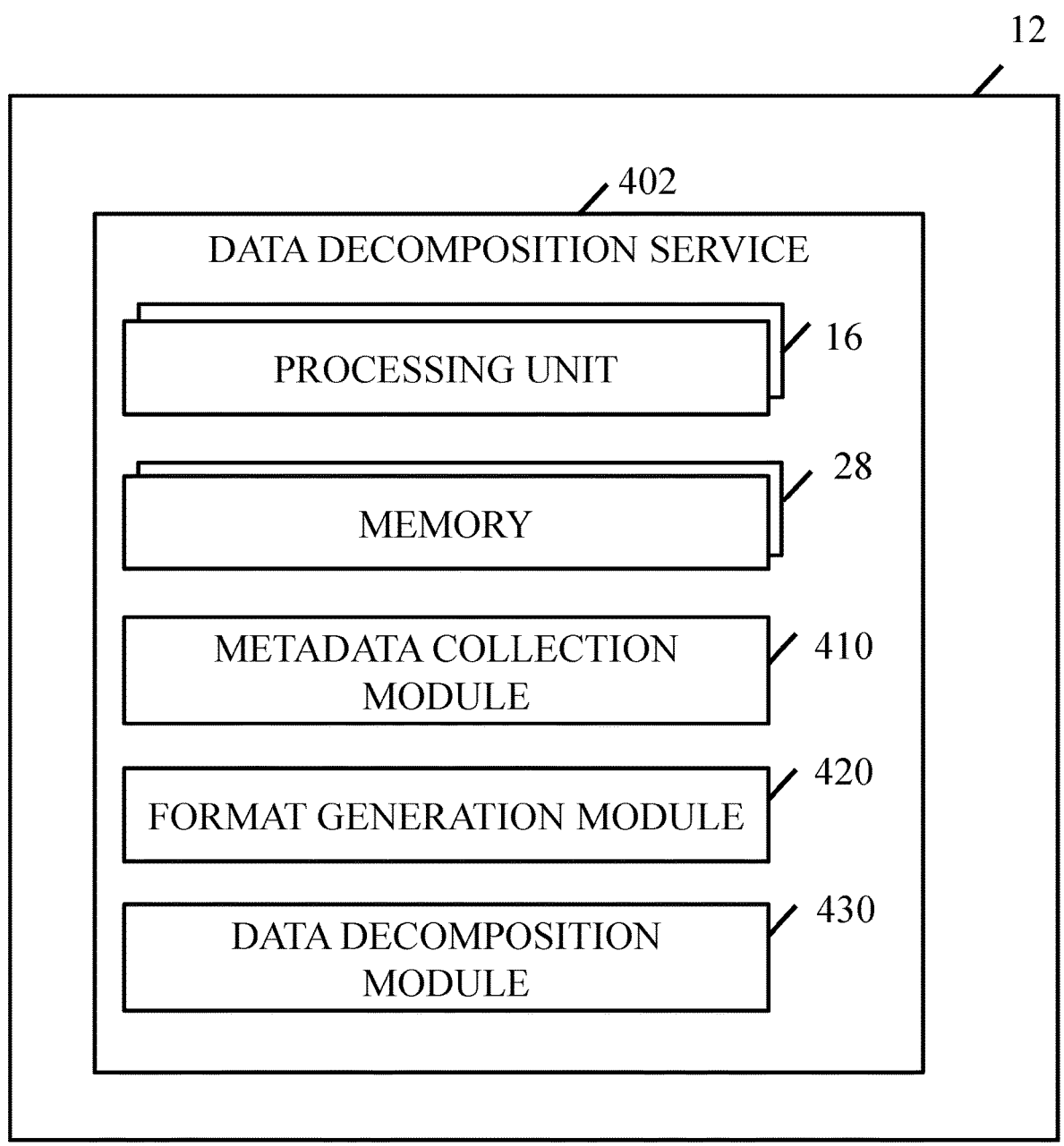
FIG. 4 depicts a schematic diagram of a computer system or server that incorporates a data decomposition service, according to one or more embodiments of the present disclosure.

Turning now to FIG. 4, a block diagram depicting a computer system/server 12 (as shown in FIG. 1) incorporating a data decomposition service 402, according to some embodiments, is shown. In one aspect, each of the devices, components, modules, and/or functions described in FIGS. 1-3 may also apply to the devices, components, modules, and functions of FIG. 4.

In some embodiments, the computer system/server 12 may provide a data decomposition service 402 (e.g., semi-structured data decomposition service), which may be in communication with and/or association with one or more databases, such as, a NoSQL database (e.g., MongoDB, IBM Cloudant, etc.). The database may store semi-structured data, such as JSON data.

The data decomposition service 402 may include one or more processing units 16 to perform various computational, data processing and/or other functionality in accordance with the present disclosure. Moreover, the data decomposition service 402 may also include at least one memory 28, as described above, along with a metadata collection module 410, a format generation module 420, a data decomposition module 430, and/or the like, which may be implemented as the program modules 42, as described above.

Figure 5:
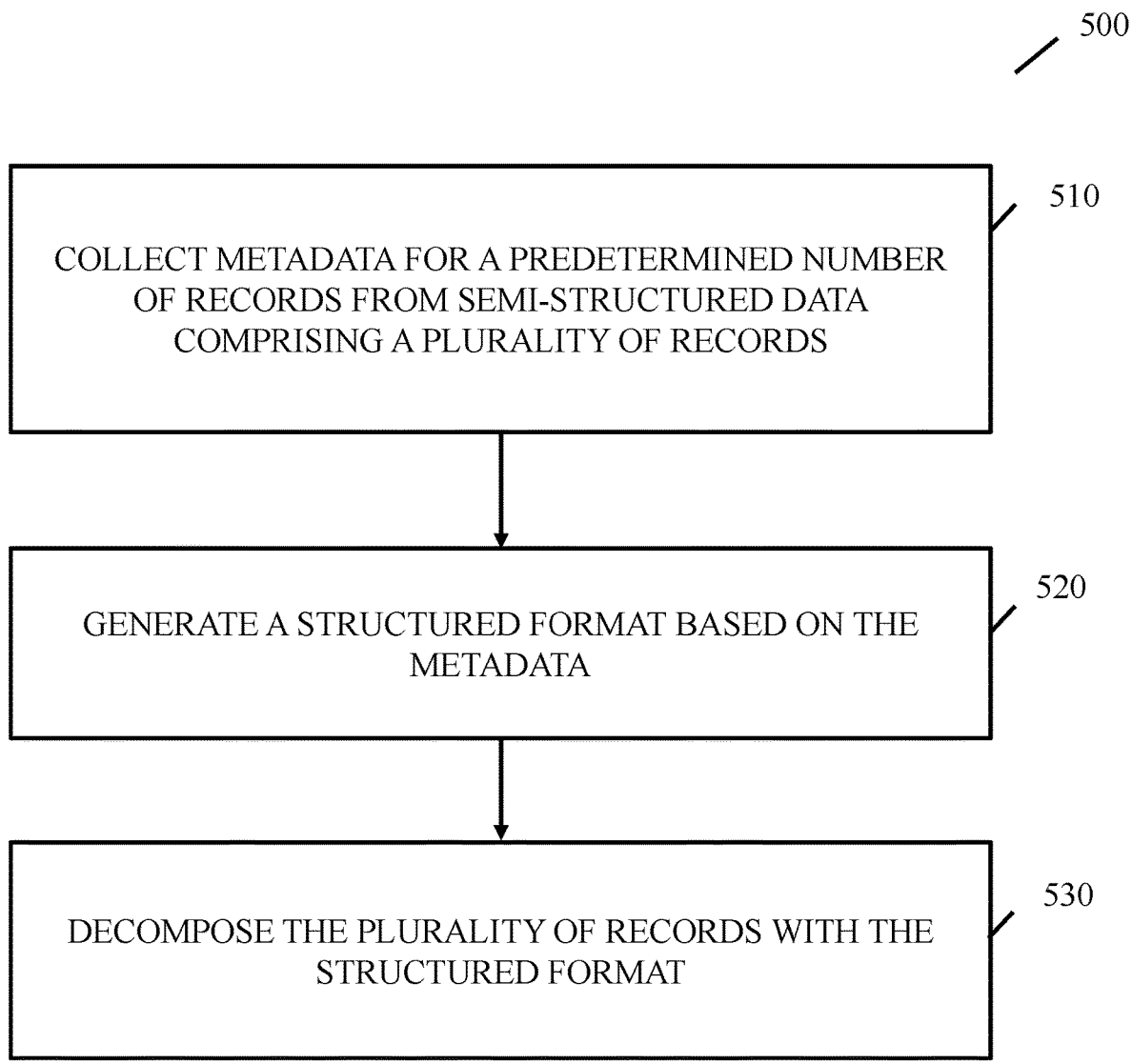
FIG. 5 depicts a schematic flowchart of a method for decomposing semi-structured data, according to one or more embodiments of the present disclosure.

With reference now to FIG. 5, a schematic flowchart of a method 500 for decomposing semi-structured data is depicted, in which various aspects of some embodiments of the present disclosure may be implemented.

It can be noted that the processing of decomposition of semi-structured data according to embodiments of this disclosure could be implemented by the computer system/server 12 as described above. One or more of the operations of FIGS. 1-4 may also be included in one or more operations or actions of FIG. 5. Repetitive description of like elements, components, modules, services, application, and/or functions employed in other embodiments described herein is omitted for sake of brevity.

Embodiments of the present disclosure will be described below with reference to the computer system/server 12 shown in FIG. 4 and method 500 shown in FIG. 5.

At block 510, the data collection module 410 collects metadata for a predetermined number of records from semi-structured data that includes or is composed of a total or a plurality of records.

In an aspect, the metadata collection module 410 may perform a pre-fetching process on the semi-structured data from the database based on a pre-fetch size, i.e., the predetermined number, to obtain at least some of the plurality of records, i.e., the predetermined number of records. For example, the semi-structured data may be in a JSON format. The JSON data may comprise a plurality of JSON records. Specifically, the JSON data may be a JSON array, stored in a column, wherein each row of the column stores a JSON record. In such case, the metadata collection module 410 may prefetch/obtain some (e.g., the predetermined number) of the JSON records from the JSON data.

In an embodiment, the predetermined number may be, for example, defined by a user. Moreover, the predetermined number may be determined based on a number of the plurality of records in the semi-structured data and a predetermined threshold. For example, when the number of the plurality of records is higher than the threshold, the predetermined number may be determined as the threshold. Otherwise, when the number of the plurality of record is equal to or lower than the threshold, the predetermined number may be the same as the number of the records in the semi-structured data. In other words, all the records in the semi-structured data can be prefetched. In any case, the predetermined number may be used for controlling a parsing scope of the semi-structured data.

Further, the metadata collection module 410 may parse the prefetched predetermined number of records to collect the metadata. Specifically, each of the records may comprise one or more attributes. Each attribute may be represented by a pair of attribute name and attribute value. For example, the metadata collection module 410 may determine a plurality of attribute names (and a plurality of attribute values, if needed) from the predetermined number of records, such that the metadata may comprise the attribute names (and the attribute values, if needed). Also, the metadata collection module 410 may determine a number of respective attribute names in the predetermined number of records and include them in the metadata.

Moreover, some of the attributes may be nested with one or more internal objects, each of which comprises one or more child attributes. Such attribute may be referred to as a nested attribute. The child attribute may be represented by a pair of child attribute name and child attribute value. Thus, the metadata collection module 410 may further determine a plurality of child attribute names (and a plurality of child attribute values, if needed) from the predetermined number of records, such that the metadata may further comprise the child attribute names (and the child attribute values, if needed).

Furthermore, the metadata collection module 410 may further parse the predetermined number of records, to determine, for each nested attribute, several of the one or more internal objects. Also, the metadata collection module 410 may determine a number of the child attribute names in each internal object of the respective nested attributes. Thus, the metadata collection module 410 may include the respective numbers in the metadata.

In an example, the JSON record may comprise multiple attributes, i.e., name/value pairs. Data type of the names (also referred to as attribute names) may be string. Data type of the values (also referred to as attribute values) may be string, number, Boolean, null, object, and/or array. A JSON array may comprise one or more objects. Noted that, the first four data types (string, number, Boolean and null) can be referred to as simple data types (or first data types). The other two data types (object and array) can be referred to as complex data types (or second data types). The attribute value in the complex data types means that the corresponding attribute is nested with one or more internal objects. Each internal object includes one or more child attributes represented by a pair of child attribute name and child attribute value. Data types of the child attributes are similar to the data types of the attributes and may not be detailed for sake of brevity.

In an embodiment, for the attributes with the attribute values in the simple data types, such as string, number, Boolean, null, metadata collection module 410 may determine a plurality of attribute names. The determined attribute names may be included in the metadata.

In another embodiment, for the attributes with the attribute values in the complex data types, such as object and array, metadata collection module 410 may determine both the attribute names and the child attribute names, which may be included in the metadata. Moreover, the metadata collection module 410 may join the respective child attribute names with the corresponding attribute names, as joined names. The joined names may also be included in the metadata.

At block 520, the format generation module 420 generates a structured format based on the metadata, for example, the attribute names and/or the child attribute names (or joined names) in the metadata.

In some embodiments, the structured format may comprise a plurality of components, each component corresponding to one of the attribute names and the child attribute names (or the joined names) in the metadata. Moreover, the structured format may be stored in a table with a single row, for example. Each column of the table may store one of the components.

Further, the structured format may be generated in a configurable way. Thus, the collected metadata may be filtered such that only the attribute names and/or the child attribute names (or the joined names) satisfying certain requirements can be used for the structured format generation.

For example, for each of the plurality of attribute names in the metadata, the format generation module 420 may determine a first presence ratio of the attribute name present in the predetermined number of records. For example, the first presence ratio of a specific attribute name may be calculated based on a number of the specific attribute names in the predetermined number of records (for example, from the metadata) divided by the predetermined number. If the first presence ratio is higher than a predetermined ratio threshold for the attribute name, the format generation module 420 may determine the attribute name as a first component of the structured format. Accordingly, the format generation module 420 may add the first component in the structured format.

Respective ratio thresholds for the attribute names may be specified by the user according to actual needs. Specifically, the respective ratio thresholds may be the same or different.

In some further embodiments, the format generation module 420 may identify a first attribute name corresponding to a first nested attribute from one or more nested attributes. For example, the first nested attribute (typically, the child attribute value of the first nested attribute) may be further parsed to determine the respective child attributes.

In an aspect, the first nested attribute may be defined by a user based on user need or importance. For example, the user may use the attribute which contains important information as the first nested attribute.

Alternatively, the first nested attribute may also be determined based on data parsing. As described above, the metadata may comprise the number of internal objects for each nested attribute. Then, the format generation module 420 may determine the nested attribute having the maximum number of the internal objects as the first nested attribute, such that the corresponding attribute name is configured as first attribute name.

In further embodiments, for each child attribute name associated with the first attribute name (or each joined name containing the first attribute name), the format generation module 420 may determine a second presence ratio of the child attribute name (or joined name) present in the internal objects in the first nested attribute. For example, the second presence ratio of a specific child attribute name (or joined name) may be calculated based on the number of the specific child attribute name (or joined name) in the predetermined number of records divided by the number of internal objects of the first nested attribute in the predetermined number of records, based on the metadata.

When the second presence ratio is higher than a predetermined ratio threshold for the child attribute name (or joined name), the format generation module 420 may determine the child attribute name (or joined name) as a second component of the structured format. Therefore, the format generation module 420 may add the second component in the structured format. For avoiding that the structured format contains both the first component and the second component corresponding to a same attribute (for example the first nested attribute), the first component corresponding to the first attribute name may be removed from the structured format.

The ratio thresholds for the respective child attribute names (or joined names) may be specified by the user according to actual needs. For example, the respective ratio thresholds may be the same or different.

In some embodiments, if either the prefetched records do not contain the nested attribute, or there is no first nested attribute in the nested attribute, the structured format may be generated to include the first components, each corresponding to a specific attribute name satisfying the requirement for presence ratio. In other embodiments, if the first attribute name is determined for the nested attribute, the structured format may be generated to include the first components (each corresponding to the attribute name which is not the first attribute name) and the second components (each corresponding to the child attribute name related to the first attribute name or the joined name containing the first attribute name) if the requirements for presence ratios are satisfied.

At block 530, the data decomposition module 430 decomposes the plurality of records (also the semi-structured data) with the structured format.

In some embodiments, the data decomposition module 430 may obtain the respective records in the semi-structured data sequentially or in parallel. For each record, the data decomposition module 430 may locate the attribute values for the first components in the structured format, based on the attribute names in the record. Thus, the data decomposition module 430 may determine a first set of values for the first components in the structured format with the corresponding attribute values. That is, the value of each of the first components may be determined with the corresponding attribute value based on the corresponding attribute name.

For example, if the attribute value is in the simple data type (string, number, Boolean and null), the value of the corresponding first component may be directly determined with the attribute value. If the attribute value is in the complex data type (object and array), the data decomposition module 430 may firstly generate a string for the attribute value, which may then be used as the value of the corresponding first component. Moreover, if the attribute value cannot be located for a specified first component (or, if the corresponding attribute is not in the record), the value of the specified first component may be determined as a NaN (Not a Number). It can be understood that the attribute in the record may be filtered out, if its attribute name does not correspond to any of the first components in the structured format (e.g., the attribute does not satisfy the customized requirements, such as the requirements for the presence ratio).

Therefore, the data decomposition module 430 may decompose the record into the first set of values corresponding to the first components in the structured format.

Further, the data decomposition module 430 may determine whether there is the first attribute name in the record.

In response to the first attribute name not being in the record, the data decomposition module 430 may output the first set of values for the first components based on the structured format.

Otherwise, in response to the first attribute name being in the record, the data decomposition module 430 may locate the child attribute values for the second components in the structured format, based on the joined names comprising the first attribute name or the child names related to the first attribute name in the record. Thus, the data decomposition module 430 may determine, for each of the second components, a value with the corresponding child attribute value.

For example, if the child attribute value is in the simple data type (string, number, Boolean and null), the value of the corresponding second component may be directly determined with the child attribute value. If the child attribute value is in the complex data type (object and array), the data decomposition module 430 may firstly generate a string for the child attribute value, which may then be used as the value of the corresponding second component. Moreover, if the child attribute value cannot be located for a specified second component (or, if the corresponding child attribute is not in the record), the value of the specified second component may be determined as a NaN (Not a Number). It can be understood that the child attribute in the record may be filtered out, if its joined name (the child attribute name and the attribute name) does not correspond to any of the second components in the structured format (e.g., the child attribute does not satisfy the customized requirements, such as the requirements for the presence ratio).

Therefore, the data decomposition module 430 may further decompose the record into a second set of values corresponding to the second components in the structured format. Then, the decomposition module 430 may append the second set of values to the first set of values. Further, the decomposition module 430 may output the appended set of values (i.e., the first components and the second set of values) based on the structured format.

In some embodiments, the data decomposition module 430 may perform the above operations on each of the records in the semi-structured data, sequentially or in parallel. Accordingly, a plurality sets of values and/or appended set of values may be output in queue. In some embodiments, the output queue may be stored in a table in a relational database. For example, in the table, a first row may store the respective components (the first components and the second components) in the structured format, while other rows may store the output sets of values. Additionally, the output queue and/or the table may be presented via a user interface.

Figure 6:
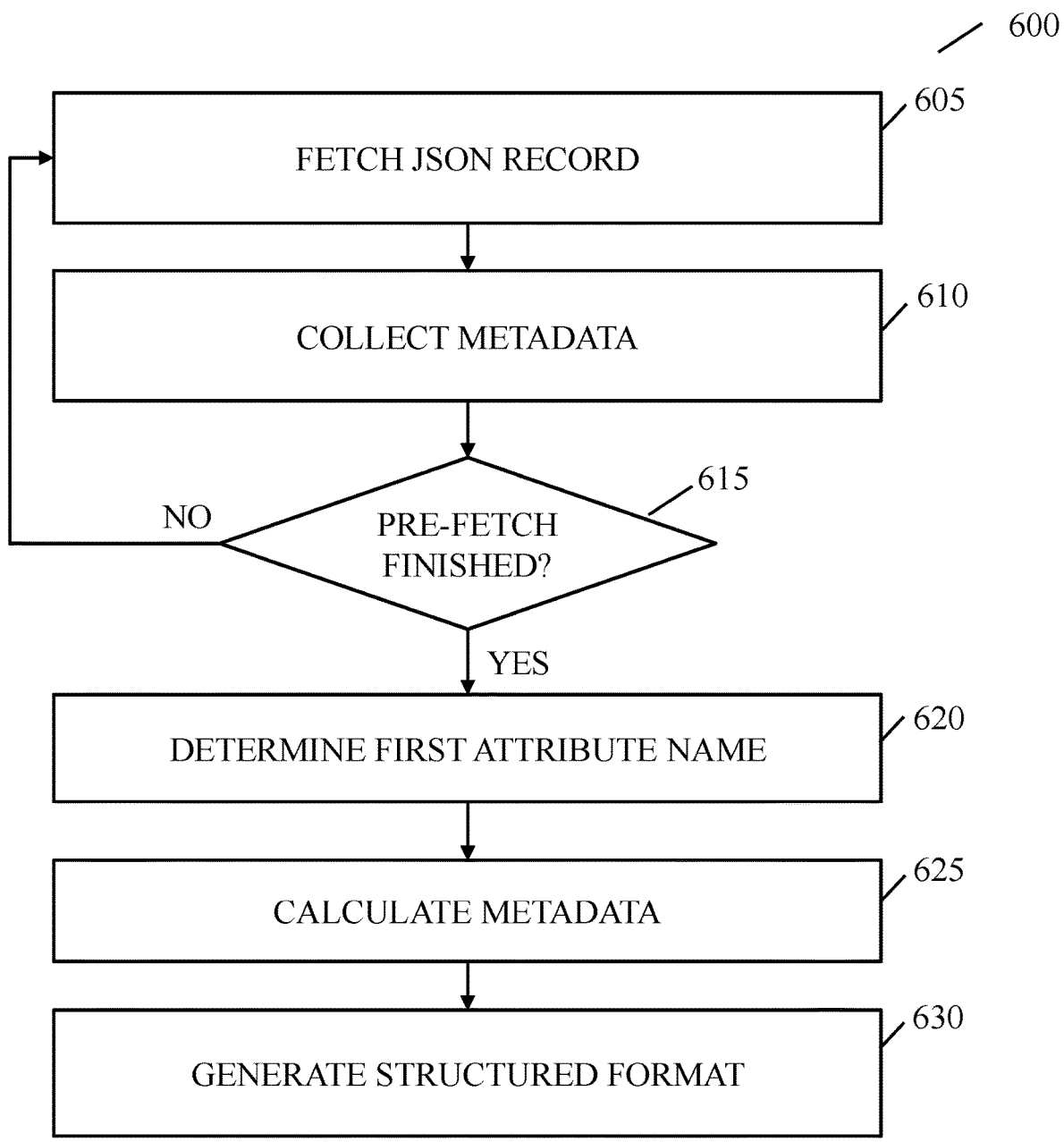
FIG. 6 depicts an illustrative flowchart of a process of generating a structured format, according to one or more embodiments of the present disclosure.

Turning now to FIG. 6, an illustrative flowchart of a process 600 for generating a structured format for semi-structured data is depicted according to some embodiments of the present disclosure.

It can be noted that the processing of generating a structured format according to embodiments of this disclosure could be implemented by the computer system/server 12. Moreover, the process 600 for generating a structured format may be implemented by blocks 510 and 520 in FIG. 5.

In some embodiments, the semi-structured data may be a JSON array surrounded by square brackets [ ], as shown below as Example 1.

Example 1

```
data = [{'state': 'Florida',
    'shortname': 'FL',
    'info': {'governor': 'Rick Scott'},
```

-continued

```
    'counties': [{'name': 'Dade', 'population': 12345},
        {'name': 'Broward', 'population': 40000},
        {'name': 'Palm Beach', 'population': 60000}]},
    'state': 'California',
        'shortname': 'CA',
        'counties': [{'name': 'Alameda', 'population': 14436},
            {'name': 'Contra Costa' }]},
    'state': 'Ohio',
        'shortname': 'OH',
    'info': {'governor': 'John Kasich'}}]
```

In Example 1, the JSON array comprises 3 rows, each of which can be referred to as a JSON record surrounded by curly brace { }.

At 605, a first JSON record may be fetched/obtained from the JSON array.

First JSON Record:

```
{'state': 'Florida',
    'shortname': 'FL',
    'info': {'governor': 'Rick Scott'},
        'counties': [{'name': 'Dade', 'population': 12345},
            {'name': 'Broward', 'population': 40000},
            {'name': 'Palm Beach', 'population': 60000}]}
```

Then, the first JSON record may be parsed, such that metadata may be collected for the first JSON record, at 610. For example, the metadata for the first JSON record may comprise a plurality of attribute names (such as, state, shortname, info and counties), a plurality of child names (such as, governor, name and population), a plurality of joined names (such as, info.governor, counties.name, counties.population), a plurality of attribute names of the attributes nested with object(s) (such as, info and counties), a number of object(s) in the respective nested attributes (such as, info: 1, counties: 3), a number of joined name(s) (and/or child attribute name(s)) in the respective nested attributes (such as, info.governor: 1, counties.name: 3, counties.population: 3) and/or the like.

In some embodiments, a pre-fetch size (i.e., a predetermined number) of the JSON records may be predefined, for example, by a user, as 2. Thus, at 615, it is determined that the pre-fetch process has not finished, as only one JSON record has been fetched thus far.

Accordingly, the process continues to 605, a next second JSON record may be fetched/obtained from the JSON array.

Second JSON Record:

```
{'state': 'California',
    'shortname': 'CA',
    'counties': [{'name': 'Alameda', 'population': 14436},
        {'name': 'Contra Costa'}]}
```

At 610, the second JSON record may be parsed, such that metadata for the second JSON record may be collected. For example, the metadata for the second JSON record may comprise a plurality of attribute names (such as, state, shortname and counties), a plurality of child names (such as, name and population), a plurality of joined names (such as, counties.name, counties.population), an attribute name of the attribute nested with objects (such as, counties), the number of objects in the nested attribute (such as, counties: 2), a number of joined name(s) (and/or child attribute name(s)) in the nested attribute (such as, counties.name: 2, counties.population: 1) and/or the like.

At 615, it is determined that the pre-fetch process has finished, as the predetermined number (2) of records has already been fetched. Thus, the process continues to 620, where a first attribute name may be determined, such that the corresponding attribute value may be further parsed to determine the child attribute name. For example, the attribute name 'counties' may be specified as the first attribute name by the user in advance. Alternatively, the first attribute name may also be determined based on the number of objects in the respective nested attributes in the obtained JSON records. For example, the numbers of objects in the respective nested attributes in both the first JSON record and the second JSON record may be calculated based the metadata, such as, info: 1, counties: 5. By comparing the calculated object numbers, the attribute name 'counties' with more object numbers may be identified as the first attribute name.

At 625, some statistics may be calculated based on the metadata, as follows. For example, the number of the respective attribute names may be determined, such as, state: 2, shortname: 2, info: 1. The presence ratio for the respective attribute names present in the obtained JSON records may be determined, such as, state: 100%, shortname: 100%, info: 50%. Note that, the presence ratio for the first attribute name (i.e., counties) may not be calculated herein, as the presence ratios for the joined names containing the first attribute name in the corresponding objects may be calculated separately as follows. For example, the number of the respective joined names containing the first attribute name may be determined, such as, counties.name: 5, counties.population: 4. Moreover, the presence ratios for the respective joined names present in the corresponding objects may be determined, such as, counties.name: 100%, counties.population: 80%.

At 630, a structured format may be generated based on the calculated statistics. For example, the attribute names and/or the joined names satisfying certain requirements for the presence ratio may be selected as components of the structured format.

For example, ratio thresholds may be defined for the respective attribute names and/or the joined names by the user. If the ratio thresholds are defined as the same as 60%, for the respective attribute names and/or the respective joined names, the format generation module 420 may select the attribute names and the joined names with the presence ratio higher than 60%, such as, state, shortname, counties.name, and counties.population as first components and second components of the structured format respectively.

Therefore, the structured format may be generated with the selected attribute names (the first components) and the selected joined names (the second components). For example, the structured format for the JSON array may be generated as a one-row table as Example 2 shows:

Example 2

| state | shortname | counties.name | counties.population |
| --- | --- | --- | --- |

In another example, the joined names in the structured format may be replaced by the corresponding child attribute names.

Therefore, the structured format may be generated in a customized way. For clarity, as the pre-fetch size, the first attribute name, and/or the ratio thresholds change, the structured format for the JSON array may be generated differently.

Figure 7:
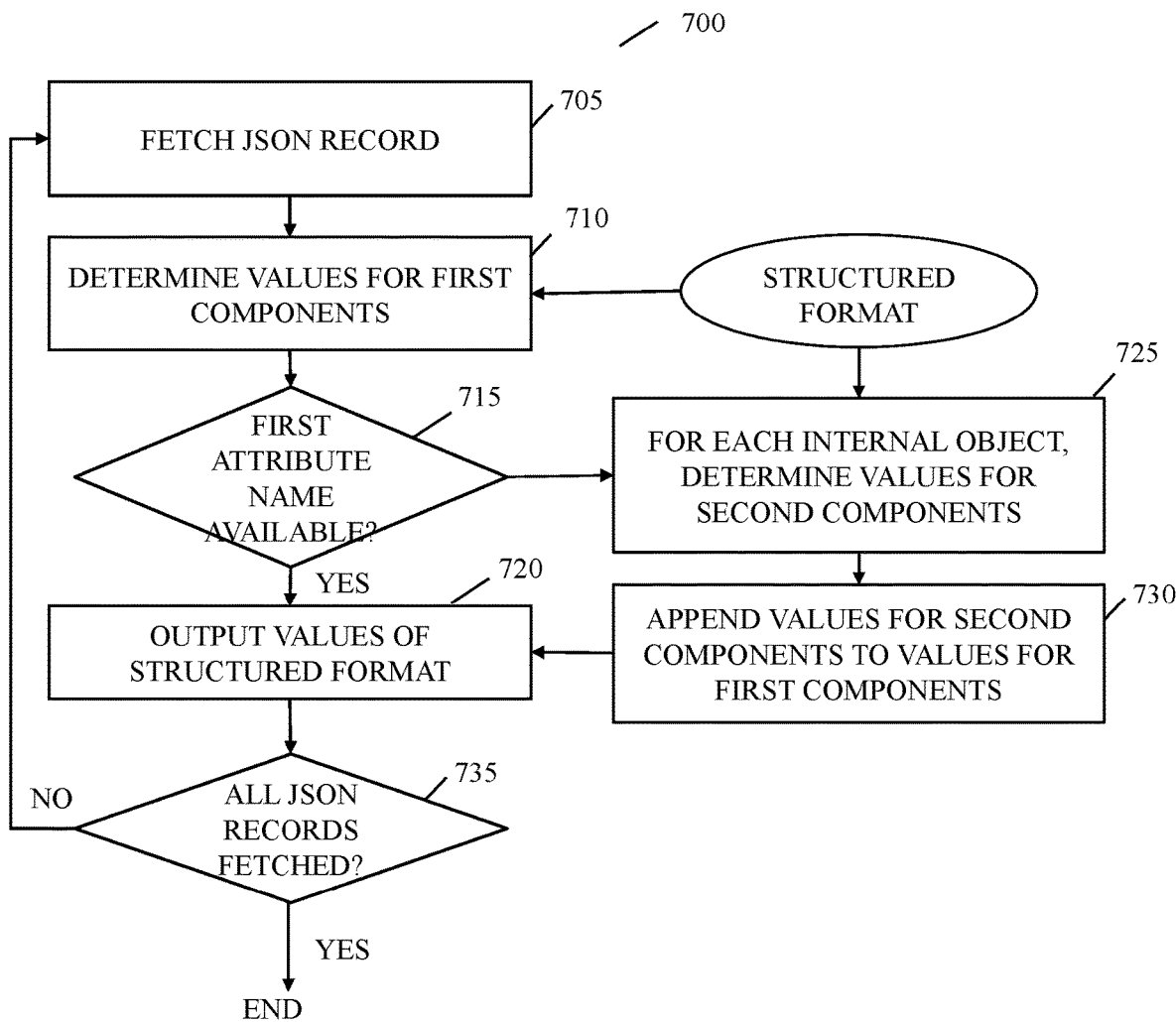
FIG. 7 depicts an illustrative flowchart of a process of decomposing semi-structured data with a structured format, according to one or more embodiments of the present disclosure.

Turning now to FIG. 7, an illustrative flowchart of a process 700 for decomposing semi-structured data with the generated structured format is depicted, according to some embodiments of the present disclosure.

The processing of generating a structured format according to embodiments of this disclosure could be implemented by the computer system/server 12 as described above. Moreover, the process 700 for decomposing semi-structured data may be implemented by block 530 in FIG. 5.

In some embodiments, the process 700 will be described with reference to the JSON array in Example 1 and the generated structured format in Example 2.

At 705, the first JSON record may be fetched/obtained from the JSON array. At 710, values for the first components of the structured format may be determined with the corresponding attribute values. For example, for the first JSON record, the value for 'state' may be determined as 'Florida', and the value for 'shortname' may be determined as 'FL'.

At 715, it can be determined whether the first attribute name 'counties' is in the first JSON record. As the first attribute name 'counties' is in the first JSON record, the process continues at 725. For each of the objects in the attribute with the first attribute name, the child attribute values may be used to determine the values of the corresponding second components. For example, for the first internal object ({'name': 'Dade', 'population': 12345}), the value for 'counties.name' may be determined as 'Dade', and the value for 'counties.population' may be determined as '12345'. For the second internal object ({'name': 'Broward', 'population': 40000}), the value for 'counties.name' may be determined as 'Broward', and the value for 'counties.population' may be determined as '40000'. For the third internal object ({'name': 'Palm Beach', 'population': 60000}), the value for 'counties.name' may be determined as 'Palm Beach', and the value for 'counties.population' may be determined as '60000'.

Then, at 730, the values for the second components for each internal object may be appended with the values for the first components. Next, at 720, a plurality of sets of values for the structured format may be output based on the first JSON record, as follows.

Florida FL Dade 12345

Florida FL Broward 40000

Florida FL Palm Beach 60000

As it is determined that not all JSON records are fetched at 735, the process continues to fetch the second JSON record at 705. Operations for generating values of components in the structured format for the second JSON record are similar with that for the first JSON record. As no child attribute value is found for the component 'counties.population' in the second internal object (i.e., {'name': 'Contra Costa'}), a NaN(Not a Number) may be used as the corresponding value. Thus, a plurality sets of values for the structured format may be output based on the second JSON record, as follows.

California CA Alameda 14436

California CA Contra Costa NaN

Next, the third JSON record may be fetched at 705, as below.

Third JSON Record:

```
{'state': 'Ohio',
    'shortname': 'OH',
    'info': {'governor': 'John Kasich'}}]
```

At 710, values for the first components (state and shortname) may be determined as: Ohio and OH. As the first attribute name 'counties' is not found in the third JSON record at 715, the process continues directly at 720. Thus, the determined values may be output along with NaNs for the second components, as follows.

Ohio OH NaN NaN

Therefore, all JSON records are fetched and decomposed, such that the decomposition process ends. The output values may be stored in a table with reference to the structured format. Moreover, indexes may be further included in the table for the respective set of values. EXAMPLE 3 is an exemplary table form, which is presented below.

Example 3

|   | state | shortname | counties.name | counties.population |
|---|---|---|---|---|
| 1 | Florida | FL | Dade | 12345 |
| 2 | Florida | FL | Broward | 40000 |
| 3 | Florida | FL | Palm Beach | 60000 |
| 4 | California | CA | Alameda | 14436 |
| 5 | California | CA | Contra Costa | NaN |
| 6 | Ohio | OH | NaN | NaN |

Based on the embodiments of the present disclosure, the semi-structured data can be decomposed in a convenient and flexible way. The prefetch size may be defined to control a data parsing scope for the data to be decomposed. Metadata and statistics of the metadata may be collected during prefetching. The first attribute name and/or the ratio threshold for presence ratio may be configured to filter the attributes to generate a customized semi-structured format.

It can be noted that, the sequence of the blocks described in the embodiments are merely for illustrative purposes. Any other appropriate sequences (including addition, deletion, and/or modification of at least one block) can also be implemented to realize the corresponding embodiments.

Additionally, in some embodiments of the present disclosure, an apparatus for decomposing semi-structured data may be provided. The apparatus may comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for decomposing semi-structured data may be provided. The computer program product may comprise a computer readable storage medium having program instructions embodied therewith. The program instructions executable by one or more processors causes the processor to perform the above method.

Embodiments of the present disclosure may be a system, a method, and/or a computer program product at any possible technical detail level of integration. The computer program product may include a computer readable storage medium (or media) having computer readable program instructions thereon for causing a processor to carry out aspects of embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present disclosure.

Aspects of embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer implemented method, comprising:
   determining, by one or more processing units, a predetermined number of different records from semi-structured data from which to collect metadata therefrom, wherein the semi-structured data comprises a plurality of records respectively comprising one or more attributes represented by a pair of attribute name and attribute value and wherein the predetermined number is smaller than a quantity of the plurality of records;
   collecting, by one or more processing units, metadata for the predetermined number of different records from the semi-structured data by collecting, for each of the predetermined number of different records, at least a respective attribute name and at least one nested attribute associated with the respective attribute name, the at least one nested attribute comprising a child attribute name and a child attribute value;
   generating, by the one or more processing units, a structured format based on the metadata, by determining a first presence ratio of each respective attribute name in relation to the predetermined number of different records and, in response to a respective associated presence ratio being higher than a ratio threshold, adding the respective attribute name as a first component of the structured format and determining a second presence ratio of a child attribute name that is associated with the first component in relation to the predetermined number of different records and, in response to the second presence ratio being higher than a ratio threshold for the child attribute name, adding the child attribute name as a second component of the structured format and removing the first component from the structured format; and
   decomposing, by the one or more processing units, the plurality of records according to the structured format by extracting, for the plurality of records, an attribute value associated with the second component of the structured format, thereby generating structured data from the semi-structured data in accordance with the structured format.

2. The method according to claim 1, wherein the at least one nested attribute is defined by a user.

3. The method according to claim 1, wherein collecting metadata for the predetermined number of different records from semi-structured data comprising the plurality of records further comprises:
   determining, by the one or more processing units, for each of the at least one nested attribute, a number of one or more internal objects;
   wherein the metadata further comprises the number of one or more internal objects for each of the at least one nested attribute;
   wherein generating the structured format based on the metadata further comprises:
   determining, by the one or more processing units, a nested attribute having a maximum number of internal objects relative to the at least one nested attribute.

4. The method according to claim 1, wherein decomposing the plurality of records according to the structured format comprises:

for each of the plurality of records,
    determining, by the one or more processing units, a value for each first components in the structured format, with a corresponding attribute value;
    determining, by the one or more processing units, whether there is a first attribute name,
        in response to an absence of the first attribute name,
            outputting, by the one or more processing units, a first set of values;
        in response to a presence of the first attribute name, for each internal objects in a first nested attribute,
            determining, by the one or more processing units, a value for each second component in the structured format, with a corresponding child attribute value in an internal object of the first nested attribute;
            appending, by the one or more processing units, a second set of values to the first set of values to create a appended set of values; and
            outputting, by the one or more processing units, the appended set of values.

5. The method according to claim 4, wherein determining the value for each first components in the structured format with the corresponding attribute value comprises:
    in response to the corresponding attribute value being nested with one or more internal objects,
        generating, by the one or more processing units, a string for the attribute value; and
        determining, by the one or more processing units, the value for the first component with the string; or
    in response to an absence of the corresponding attribute value;
        determining, by the one or more processing units, the value for the first component with a Not a Number.

6. The method according to claim 5, wherein determining the value for each second component in the structured format with the corresponding child attribute value in the internal object comprises:
    in response to the corresponding child attribute value being nested with one or more internal objects,
        generating, by the one or more processing units, a string for the child attribute value; and
        determining, by the one or more processing units, the value for the second component with the string; or
    in response to an absence of the corresponding child attribute value;
        determining, by the one or more processing units, the value for the second component with a Not a Number.

7. An apparatus, comprising:
one or more processors;
a memory coupled to at least one of the one or more processors; and
computer program instructions stored in the memory and executed by at least one of the one or more processors to:
determine a predetermined number of different records from semi-structured data from which to collect metadata therefrom, wherein the semi-structured data comprises a plurality of records respectively comprising one or more attributes represented by a pair of attribute name and attribute value and wherein the predetermined number of different records is smaller than a quantity of the plurality of records;
collect metadata for the predetermined number of different records from the semi-structured data by collecting at least a respective attribute name and by collecting at least one nested attribute associated with the respective attribute name, the at least one nested attribute comprising a child attribute name and a child attribute value for each of the predetermined number of different records;
generate a structured format based on the metadata by determining a first presence ratio of each respective attribute name in relation to the predetermined number of different records and, in response to a respective associated presence ratio being higher than a ratio threshold, adding the respective attribute name as a first component of the structured format and determining a second presence ratio of a child attribute name that is associated with the first component in relation to the predetermined number of different records and, in response to the second presence ratio being higher than a ratio threshold for the child attribute name, adding the child attribute name as a second component of the structured format and removing the first component from the structured format; and
decompose the plurality of records according to the structured format by extracting, for the plurality of records, an attribute value associated with the second component of the structured format, thereby generating structured data from the semi-structured data in accordance with the structured format.

8. The apparatus of claim 7, wherein the computer program instructions that are executed by at least one of the one or more processors to decompose the plurality of records according to the structured format further cause the one or more processors to:
for each of the plurality of records,
    determine a value for each first components in the structured format, with a corresponding attribute value;
    determine whether there is a first attribute name,
        in response to an absence of the first attribute name,
            output a first set of values;
        in response to a presence of the first attribute name, for each of internal object in a first nested attribute,
            determine a value for each second component in the structured format, with a corresponding child attribute value in the internal object of the first nested attribute;
            append a second set of values to the first set of values to create a appended set of values; and
            output the appended set of values.

9. A computer program product, comprising a computer readable storage medium having computer program instructions embodied therewith, the computer program instructions executable by a one or more processors to cause the one or more processors to:
determine a predetermined number of different records from semi-structured data from which to collect metadata therefrom, wherein the semi-structured data comprises a plurality of records respectively comprising one or more attributes represented by a pair of attribute name and attribute value and wherein the predetermined number of different records is smaller than a quantity of the plurality of records;
collect metadata for the predetermined number of different records from the semi-structured data by collecting at least a respective attribute name and by collecting at least one nested attribute associated with the respective attribute name, the at least one nested attribute comprising a child attribute name and a child attribute value for each of the predetermined number of different records;

generate a structured format based on the metadata by determining a first presence ratio of each respective attribute name in relation to the predetermined number of different records and, in response to a respective associated presence ratio being higher than a ratio threshold, adding the respective attribute name as a first component of the structured format and determining a second presence ratio of a child attribute name that is associated with the first component in relation to the predetermined number of different records and, in response to the second presence ratio being higher than a ratio threshold for the child attribute name, adding the child attribute name as a second component of the structured format and removing the first component from the structured format; and decompose the plurality of records according to the structured format by extracting, for the plurality of records, an attribute value associated with the second component of the structured format, thereby generating structured data from the semi-structured data in accordance with the structured format.

10. The computer program product of claim 9, wherein the computer program instructions that are executed by at least one of the one or more processors to decompose the plurality of records with the structured format further cause the one or more processors to:

for each of the plurality of records,
  determine a value for each first components in the structured format, with corresponding attribute values;
  determine whether there is a first attribute name,
    in response to an absence of the first attribute name, output a first set of values;
    in response to a presence of the first attribute name,
      for each of internal object in a first nested attribute,
        determine a value for each second component in the structured format, with a corresponding child attribute value in the internal object of the first nested attribute;
      append a second set of values to the first set of values to create a appended set of values; and
      output the appended set of values.

* * * * *